United States Patent
Shaw et al.

(10) Patent No.: US 6,792,160 B2
(45) Date of Patent: Sep. 14, 2004

(54) GENERAL PURPOSE IMAGE ENHANCEMENT ALGORITHM WHICH AUGMENTS THE VISUAL PERCEPTION OF DETAIL IN DIGITAL IMAGES

(75) Inventors: Rodney Shaw, Mountain View, CA (US); Michael D. McGuire, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

(21) Appl. No.: 09/916,968

(22) Filed: Jul. 27, 2001

(65) Prior Publication Data

US 2003/0021488 A1 Jan. 30, 2003

(51) Int. Cl.⁷ .............................. G06K 9/38; G09G 5/02; G03F 3/08
(52) U.S. Cl. ........................ 382/272; 345/589; 358/521
(58) Field of Search ................................ 382/254, 260, 382/264, 167, 268, 168, 272, 274; 348/234, 649, 687; 345/589, 617, 619, 639, 650, 673; 358/1.16, 518, 520, 521

(56) References Cited

U.S. PATENT DOCUMENTS

| | | | |
|---|---|---|---|
| 4,792,979 A | | 12/1988 | Nomura et al. |
| 5,426,517 A | * | 6/1995 | Schwartz .................... 358/520 |
| 5,852,678 A | * | 12/1998 | Shiau et al. ................. 382/176 |
| 6,259,823 B1 | * | 7/2001 | Lee et al. .................... 382/268 |
| 6,285,798 B1 | * | 9/2001 | Lee ............................. 382/260 |
| 6,417,891 B1 | * | 7/2002 | Cacciatore et al. ......... 348/649 |
| 6,473,198 B1 | * | 10/2002 | Matama ...................... 358/1.9 |
| 6,552,731 B1 | * | 4/2003 | Gonsalves .................. 345/589 |
| 6,639,690 B1 | * | 10/2003 | Yamazaki .................. 358/1.16 |
| 2001/0007599 A1 | | 7/2001 | Iguchi et al. |

FOREIGN PATENT DOCUMENTS

EP    0947955    10/1999

OTHER PUBLICATIONS

Atsuhisa Saito et al: "Optimum Contrast Enhancement Using Fuzzy Sets" Systems and Computers in Japan, Scripta Technica Journals, NY, US vol. 22, No. 11, 1991, pp. 52–60 XP000274191.

Tizhoosh H R et al: " On Fuzzy Enhancement of Megavoltage Images in Radiation Theraphy" Fuzzy Systems, 1997, Proceedings of the sixth IEEE International Conferences on Barcelona, SPain Jul. 1–5 1997 pp. 1398–1404 XP–010242009.

Mendel JM: " Fuzzy Logic Systems for Engineering: A Tutorial" Proceedings of the IEEE, IEEE New York, US vol.83, No.3, Mar. 1995 pp. 345–377 XP000497763.

* cited by examiner

Primary Examiner—Kanji Patel

(57) ABSTRACT

A tone correction system, method and interface is described in which a digital image is initially filtered to obtain a corresponding locally averaged value for each pixel value of the image. The image is optimally filtered using a cone-type filter having a small filter radius and which favorably weights the center pixel values of the radius. Shadow and highlight values are obtained from selected shadow and highlight functions, respectively, using the locally averaged values. A tone function is derived from each of the shadow an highlight values for each pixel. Each pixel value of the image is then remapped according to its derived shadow and highlight tone functions. The tone corrected image can be reiteratively corrected by adjusting parameters of the shadow and highlight functions and remapping the image data until a desired image quality is achieved.

21 Claims, 4 Drawing Sheets

GENERAL PURPOSE IMAGE ENHANCEMENT ALGORITHM WHICH AUGMENTS THE VISUAL PERCEPTION OF DETAIL IN DIGITAL IMAGES

FIELD OF THE INVENTION

The present invention relates to the enhancement of digital images. More particularly, this disclosure provides a system and method of rendering image detail to optimize visual perception using a tone-augmentation algorithm.

BACKGROUND OF THE INVENTION

Typically, digital tone correction is applied globally over all pixel values in a digital image in order to enhance the visual appearance of the image in the sense that all pixels of a given value are mapped to the same new value. In this type of technique a single "so-called" tone curve or mapping is defined and all pixel values in the image are adjusted according to this tone curve. As a result, for each input value there is a corresponding output value. The problem with this type of global adjustment is that different areas within the image may need different types of tone adjustment, which, depending on the dynamic range and contrast of the image, will in turn depend on the local values of neighboring pixels. Consequently, a global tone adjustment technique will often enhance some regions within the image while having no visual affect or having an adverse visual affect on other regions.

As a result, local adaptive tone correction techniques have been investigated. In general, a local tone correction operation will map one input value to potentially different output values depending on the values of the neighboring pixels. This, for example, allows for simultaneous shadow and highlight adjustments, without one being to the detriment of the other.

Prior art local-tone correction techniques include manual operations for evening out image illumination by manual adjustment of image parameters. For instance, the analog darkroom techniques known as dodging and burning require a user to physically specify or identify regions of the image to be lightened or darkened. Dodging and burning consists essentially of defining and positioning physical masks during the analog exposure of a print. In the digital case, these techniques can also be carried out using a mouse or other computer interface to select specific pixels or regions in an image to be lightened or darkened. In addition to manually identifying regions for adjustment, the user must also control the amount of adjustment. The problem with this technique is that it requires a certain level of skill and a large amount of time and effort to achieve.

Another known solution is based on edge-ratio preserving algorithms. These algorithms use an iterative processing of an image in order to determine a corrected output image. This iterative process consists of taking ratios of a number of neighboring pixel values, multiplying these ratios and finally, resetting these ratios if some maximum value is achieved. In this way image edge lightness values may be reproduced in a more visually optimized manner. The assumption is that this sequence of calculations mimics the human visual system. Specifically, an observer is constantly scanning an image or scene and is presumed to be performing some type of normalization relative to the scene or image white point. The algorithms attempt to model the human visual system and reconstruct a digitally captured image with perceptually correct local color correction from a given scene. Given a calibrated input, this approach generates images that are similar to those that might be produced using the manual technique, (where a calibrated input is an image that accurately represents some physical quantity that can be directly measured, such as radiance or luminance). However, current implementations tend to be computationally intensive. In addition, there is no simple framework to allow an interactive or user specified control over these algorithms particularly when correcting uncalibrated inputs images or under, over and unevenly exposed images.

Other approaches include histogram equalization, image segmentation, or specialized hardware. Histogram equalization techniques use properties of the statistical distribution of the lightness values in the image to derive a tone correction curve for that image. Image segmentation techniques attempt to automatically partition images into specific areas of the image. These areas are then lightened or darkened based on an analysis of these areas. Hardware such as logarithmic CCD sensors and dual sampling CMOS sensors provide a better means of capturing high dynamic range scene data. However, this hardware does not specify how this high dynamic range data should be processed or mapped to a lower dynamic range devices.

The problem with all of these known techniques is that they are either computationally intensive, difficult to implement or use, are specific to a particular type of image problem, and/or are often associated with the introduction of significant artifacts.

What is needed is a low computational general purpose tone correction solution which simplifies tone adjustment/correction for the non-skilled user so as to obtain visually desirable results when correcting a wide variety of images including very high-contrast, high-dynamic range images to images lacking contrast throughout the entire dynamic range.

SUMMARY OF THE INVENTION

The present invention is an effective, intuitively simple, low computational system and method of tone correction of most types of digital images, and in particular, images of high-dynamic range. In accordance with the method, the digital image, having a plurality of pixel values, is filtered on a pixel-by-pixel basis to obtain a corresponding locally averaged value for each pixel value. Each pixel's locally averaged value is then used to obtain shadow and highlight values from selected shadow and highlight functions, respectively. At least one tone function is derived from one of the shadow and highlight values and each image pixel is then remapped according to the derived tone function to generate a remapped pixel value.

In another embodiment, the shadow value corresponding to each pixel value is used to derive a first shadow-based tone function and the highlight value is used to derive a second highlight-based tone function. Each pixel value of the image is then remapped using the first tone function to obtain an intermediate pixel value, and then each intermediate pixel value is remapped using the second tone function to obtain a final tone adjusted pixel value.

In one embodiment, function parameters of the selected highlight and shadow functions can be varied within the dynamic range of the image data to obtain adjusted shadow and highlight values. Adjusted tone functions are then derived using the adjusted shadow and highlight values and the image pixel values can be reiteratively remapped according to the method as described above using the adjusted tone functions.

The system of the present invention for tone correction of a digital image includes a preliminary image convolution n filter for generating a corresponding locally averaged pixel value for each of the plurality of pixel values in the image. A means embodying the selected highlight and shadow functions provides a corresponding highlight value and a corresponding shadow value in response to each of the locally averaged pixel values. A tone function derivator derives at least one tone function in response to the corresponding highlight and shadow values. Each pixel value is remapped by a remapper according to the at least one derived tone function to obtain a tone adjusted pixel value.

BRIEF DESCRIPTION OF THE DRAWINGS

The objects, features, and advantages of the present invention will be apparent to one skilled in the art, in view of the following detailed description in which.

DETAILED DESCRIPTION OF THE INVENTION

The present invention is a system and method of tone correction of a digital image and an interface for facilitating tone correction of a digital image. The digital image can be provided from any source including digital photography, scanned analog prints, web-images, etc. The tone correction technique is adapted to allow a user to simply perform tone correction on a variety of images ranging from very high-contrast, high-dynamic range digital images to images lacking contrast throughout the entire dynamic range.

Figure 1:
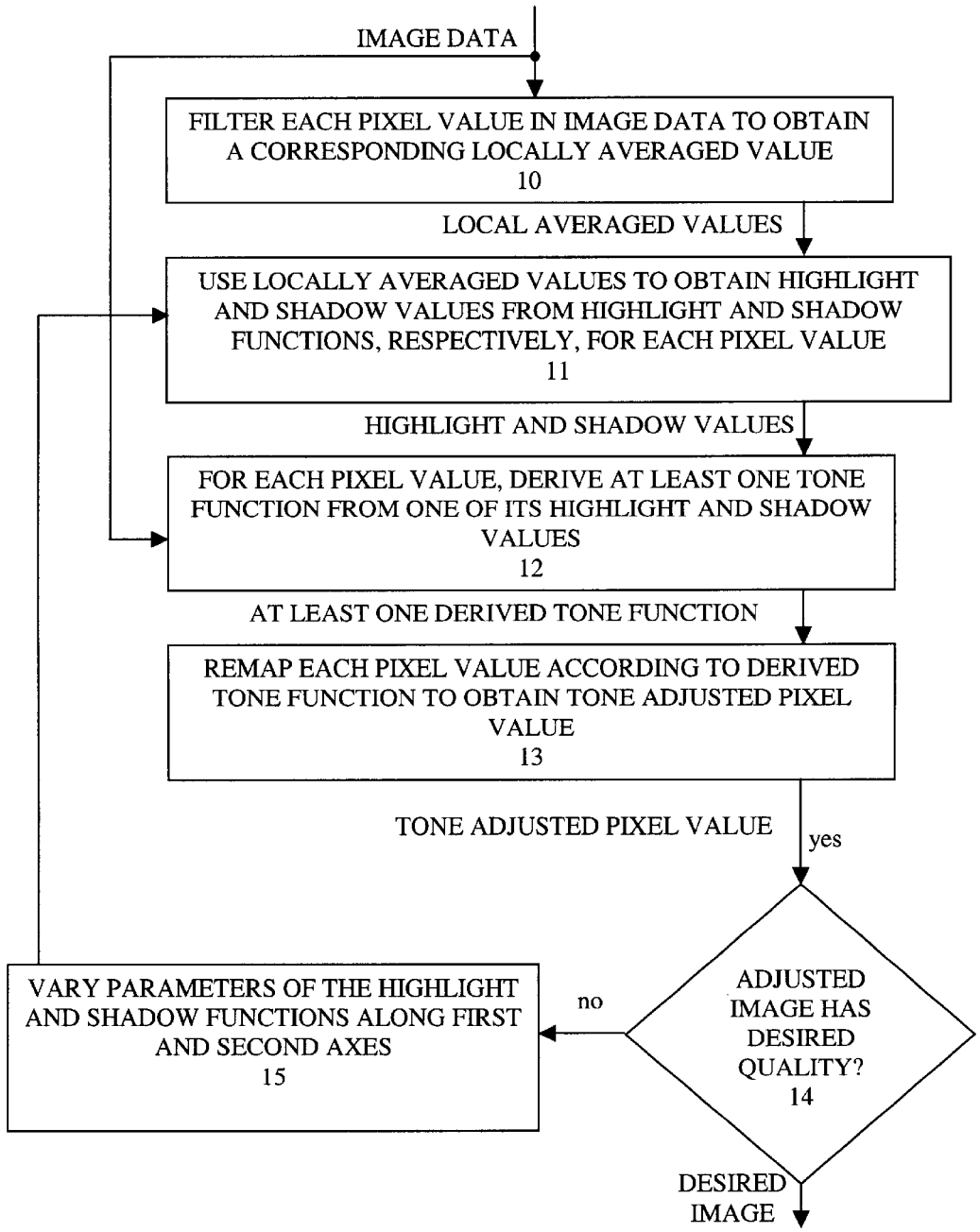
FIG. 1 illustrates a first embodiment of the method of digital image tone correction according to the present invention.

FIG. 1 shows an embodiment of the method of tone correction of a digital image according to the present invention. Initially, a digital image (including a plurality of pixel values) is filtered to obtain a locally averaged pixel value for each of its pixel values (block 10).

It should be understood that the locally averaged value is a value that is dependent on the correlation of the pixel of interest and the pixels surrounding it. In one embodiment according to the present invention the locally averaged value is obtained by averaging a small area surrounding the pixel of interest using a conical or similarly shaped weighting function centered on the pixel. This has the effect of weighting the average most strongly at the center pixel, the other pixels having progressively less weight with distance away from the center. The locally averaged value may be obtained by using other weighting functions with center emphasis such as a gaussian function. In addition, other non-conical weighting functions with center emphasis can also be used such as triangular, or square shaped functions. The small area surrounding the pixel of interest can be defined in terms of an n pixel radius area with respect to the center pixel where an n pixel radius area is equivalent to the area of a circle inscribed with a (2n+1) by (2n+1) pixel square or may actually be comprised of the whole (2n+1) by (2n+1) pixel square. In one embodiment of the method, a locally averaged value is obtained using a filter applied to a 7 pixel radius area for an image having 300 dpi resolution. In another embodiment, the filter is applied to an area having a size ranging from 1 pixel radius to an area encompassing all of the pixels in the image. In still another embodiment, the filter is applied to an area having a zero pixel radius. In other words, the locally averaged pixel value is equal to the pixel of interest.

Figure 2:
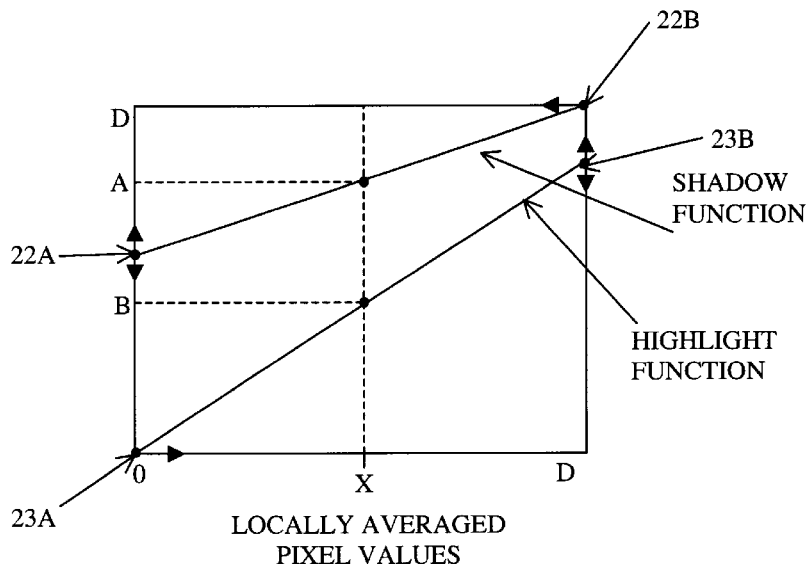
FIG. 2 illustrates obtaining highlight and shadow values from highlight and shadow functions.

Referring to FIG. 1, the locally averaged value corresponding to each pixel value is then used to obtain a corresponding highlight value and corresponding shadow value from selected highlight and shadow functions (block 11). FIG. 2 shows a graphical representation of a selected highlight function and a selected shadow function. It should be understood, that each selected shadow and selected highlight function is represented by a straight line for ease of representation. However, it should not be construed that these functions are restricted to linear-type functions. The functions can be, for example, power functions of the form output=(input)$^\gamma$, where $\gamma$ is a number greater than zero. Other applicable function types could be used.

Each of the selected functions is bounded by a maximum and minimum pixel value along first and second axes. For instance as shown in FIG. 2, the shadow function is bounded by its end point 22A along the y-axis between 0 and D (i.e., between the minimum and maximum pixel values of the image) and its other end point 22B along the x-axis between 0 and D. Similarly, the highlight function is bounded by its end points 23A and 23B along the x and y axes between 0 and D. It should be understood in the case in which image data is encoded as eight bit pixel values, then D=255.

As graphically shown in FIG. 2, a locally averaged pixel value X is used to obtain a highlight value B and a shadow value A. In one embodiment, these values can be obtained by mathematically solving each of the highlight and shadow functions for a given input value of X using a mathematical processor. Alternatively, in one embodiment, a table of values can be stored in digital storage which represents each of the highlight and shadow functions such that a corresponding highlight value and corresponding shadow value is provided when the table is accessed by the locally averaged value X.

One of the highlight and shadow values is used to derive at least one tone function for each pixel of interest (block 12) and the at least one tone function is used to remap the pixel of interest to obtain a tone adjusted pixel value (block 13). Blocks 11–13 are performed for all pixel values in the image.

Also shown in FIG. 1 the method can be reiteratively performed if the desired image quality is not obtained. If after processing all pixel values the desired image quality is not obtained (block 14, FIG. 1), the parameters of the highlight and shadow functions can be varied along the first and second axes (block 15) after which blocks 11–14 are repeated until the desired image quality is achieved.

Figure 3:
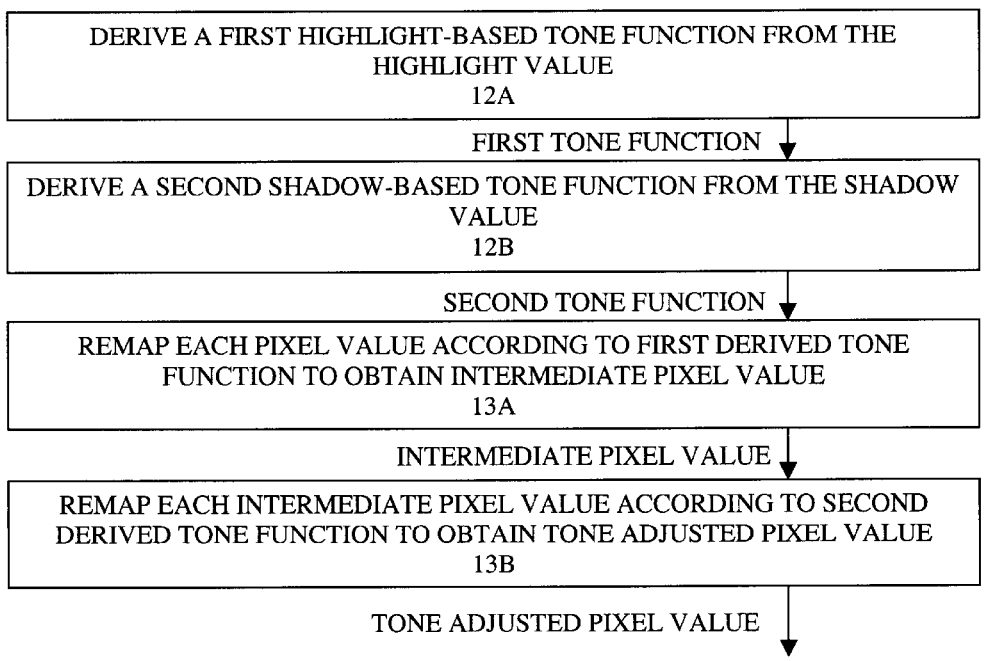
FIG. 3 illustrates a second embodiment of the method of digital image tone correction according to the present invention.

FIG. 3 shows another embodiment of the method shown in FIG. 1 in which blocks 12 and 13 are performed according to blocks 12A, 12B, 13A, and 13B. In particular, after highlight and shadow values are obtained (block 11), a first shadow-based tone function is derived from the shadow value (block 12A) and a second highlight-based tone function is derived from the highlight value (block 12B). The pixel value of interest is then remapped using the first tone function to obtain an intermediate pixel value (block 13A). The intermediate pixel value is then remapped using the second tone function to obtain a tone adjusted pixel value (block 13B). Once the tone adjusted pixel value is obtained, the method is then performed as shown in FIG. 1, block 14.

It should be understood that the methods as shown in FIGS. 1 and 3 can be performed such that locally averaged values are obtained for all of the pixel values of the image and then pixels are tone adjusted according to blocks 11–13 on a pixel-by-pixel basis prior to performing block 14.

Function parameters can be adjusted as show in FIG. 2 such that the bounded end points of the functions can be adjusted/slid along the given axis towards the maximum or minimum bounding pixel values (e.g., 0 and D). For instance, as shown in FIG. 2 end points 22A and 23B of the shadow and highlight functions, respectively, can be adjusted to a value between 0 and D along the y-axis and endpoints 23A and 22B can be adjusted to a value between 0 and D along the x-axis.

Tone functions are derived using the shadow and highlight values. Referring to the functions shown in FIG. 2, the first shadow-based tone function depends on the parameter A, which is the value of the shadow function for the value of the locally averaged value X at the pixel of interest. The second highlight-based tone function depends on the parameter B, which is the value of the highlight function for the value of the locally averaged value X at the pixel of interest.

In one embodiment, the first shadow-based tone function for a pixel value less than A is mathematically defined as:

$$\text{output} = D * \left(\frac{\text{input}}{A}\right) \quad \text{(Eq. 1)}$$

where D is the dynamic range of the image (i.e., maximum possible pixel value−minimum possible pixel value), output is the tone adjusted pixel value, and input is the value of the pixel of interest. If the input pixel value is equal to or greater than A, the shadow-based tone function is defined as:

$$\text{output} = D \quad \text{(Eq. 2)}$$

Figure 4A:
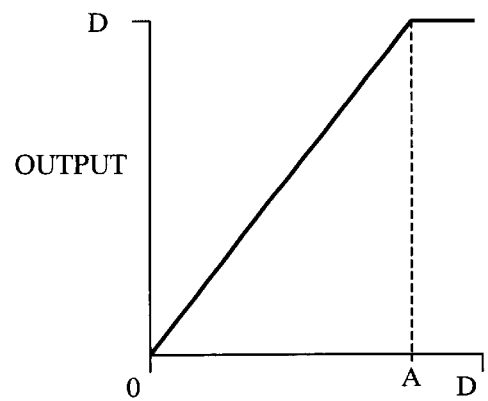
FIGS. 4A and 4B illustrate first and second tone curves derived from the highlight and shadow values obtained in FIG. 2.

The first shadow-based tone function as defined by Eqs. 1 and 2 is illustrated in FIG. 4A. This function has the effect of expanding contrast in the shadow regions and lightening shadows in the same regions.

In this embodiment, the second highlight-based tone function for an input pixel value greater than B is mathematically defined as follows:

$$\text{output} = D * \left(\frac{\text{input} - D}{D - B}\right) \quad \text{(Eq. 3)}$$

For an input pixel value less than or equal to B, the function is defined as follows:

$$\text{output} = 0 \quad \text{(Eq. 4)}$$

Figure 4B:
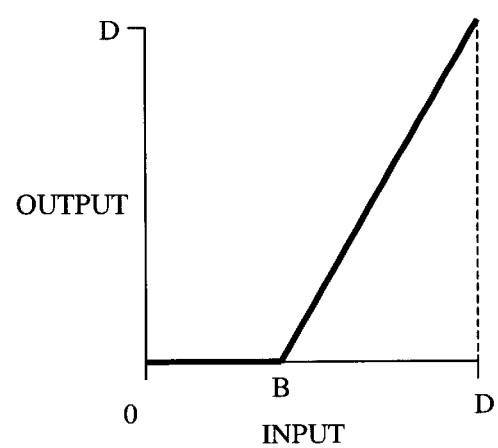

The second highlight-based tone function is illustrated in FIG. 4B. This function has the effect of expanding contrast in the highlight areas and darkening highlights in the same areas.

Other functions having these contrast expanding effects in shadows and highlights respectively can also be used, such as power functions. For example, a shadow-based tone function for input pixel values less than A can be defined as:

$$\text{output} = D * \left(\frac{\text{input}}{A}\right)^\gamma \quad \text{(Eq. 5)}$$

According to this shadow-based tone function, for γ between 0 and 1, the expansion of contrast of darker values is emphasized while for γ greater than 1, the expansion of contrast of lighter values is emphasized. Similarly, the highlight-based tone function can be defined as shown in Eq. 6:

$$\text{output} = D * \left(\frac{\text{input} - B}{D - B}\right)^\gamma \quad \text{(Eq. 6)}$$

Choice of the value of γ in Eq. 6 has similar effects as in Eq. 5. It should be understood that other shadow and highlight-based tone functions are not limited to power functions.

In one embodiment, the shadow and highlight-based tone functions can be applied in either order. However, if the highlight function is applied first and the input pixel value is less than B, the resulting output pixel value will be zero and the shadow-based tone function cannot operate on a value equal to zero. Thus, in one embodiment, the shadow-based tone function is applied prior to the highlight-based tone function.

In the preceding, the method has been described as it would be applied to a color space having a single color channel (i.e., monochrome) image in which each pixel location of an image is represented by a color value corresponding to a single color channel. The method as shown in FIG. 1 can be applied to other color or perceptual spaces having mutiple color channels (RGB, XYZ, CMYK, etc.) by generally performing the method as shown in FIG. 1 on each of the channels. In should be noted that additional processing well known in the field of color analysis and processing may be necessary in order to adapt the method to the particular color space.

For example, in the case in which color images encoded in a gamma corrected color space with red, green and blue primary colors (i.e., sRGB color space), the gamma correction is "undone" to obtain red, green, and blue (RGB) values linearized in intensity prior to performing the method according to FIG. 1 to each of the color channels. Once a tone adjusted pixel value is obtained according to the present invention for each of the linearized RGB color channels, the tone adjusted linearized RGB values are reconverted into gamma corrected values. The Effect of this is that the proportion of linearized R to G to B is the same before and after the method is applied, thus avoiding undesirable color shifts. Alternatively, the method as shown in FIG. 1 can be applied to the luminance values instead of the linearized RGB color values. In particular, a luminance value, L, is the linear combination of the linearlized RGB values:

$$L = q*R + r*G + s*B \quad \text{(Eq. 7)}$$

The coefficients q, r, and s depend on the primaries and the white point of the color space. For the sRGB space, q=0.215, r=0.7154, and s=0.0721. An original luminance value is obtained and the shadow and highlight-based tone functions are applied to it to obtain a new luminance value. Then, new RGB values can be obtained by multiplying the original linearized RGB values by the ratio of the new luminance value to the original luminance value. The linearized RGB values are then reconverted into gamma corrected values.

In still another embodiment, the luminance related values corresponding to each pixel location are separated from the chrominance values in, for example, the CIELab color space, and then the method is applied to the luminance related value as described above. Since the chrominance values are inherently separated in this space, it is not necessary to undo and redo what amounts to the gamma correction of the luminance related value.

Figure 5:
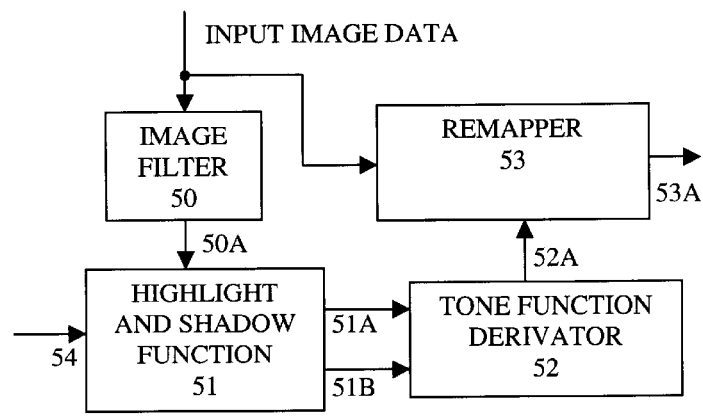
FIG. 5 illustrates an embodiment of the system of digital image tone correction according to the present invention.

FIG. 5 shows an embodiment of a system for tone correction of a digital image according to the present invention. Image data comprising a plurality of pixel values is coupled to the image filter 50 to generate locally averaged pixel values 50A. The locally averaged pixel values are used to obtain highlight and shadow values 51A and 51B from highlight and shadow functions 51. The highlight and shadow values (51A and 51B) are coupled to a tone function derivator (52) which derives at least one tone function 52A from one of the highlight and shadow values. The at least one derived tone function as well as the input image data are coupled to the remapper 53. Each pixel of interest from the image data is remapped according to the derived tone function to generate a tone adjusted pixel value 53A. FIG. 5 further shows an input 54 for providing control to adjust function parameters of the highlight and shadow functions (51) as described according to the method shown in FIG. 1.

It should be noted that the image filter (50), the highlight and shadow functions (51), the tone function derivator (52), and the remapper (53) can be implemented as one of software, hardware, firmware, and any combination of software, hardware, and firmware. It should be further understood that the highlight and shadow values can be obtained from the highlight and shadow function by mathematically solving each of the highlight and shadow functions for a given input value of X on a pixel-by-pixel basis or alternatively, a table of values can be stored in digital storage which represents each of the highlight and shadow functions such that a corresponding highlight value and corresponding shadow value is provided when each table is accessed by the locally averaged value X.

Figure 6:
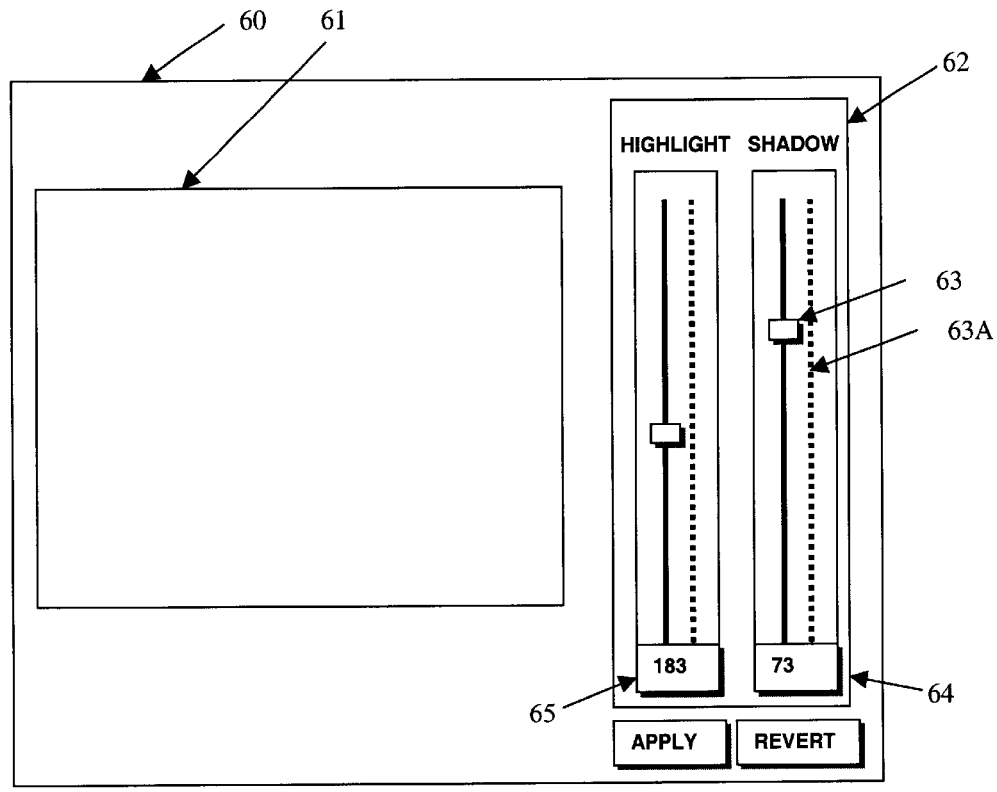
FIG. 6 is an example of a user interface for performing the method of tone correction according to the present invention.

FIG. 6 shows an example of a user interface for allowing a user to interactively perform tone correction of a digital image. As shown, the interface includes a window area 60 that is displayed on a display screen (not shown) controlled by a computer system (not shown). The computer system includes at least a graphical processor for displaying digital data on the display screen in response to pixel data. Within the window area 60 the interface includes another window area 61 for displaying the digital image of interest. After all pixel values of the digital image is tone adjusted according to the method of the present inventions, the adjusted image is redisplayed.

The interface further includes a window area 62 including a means for allowing a user to adjust function parameters of the highlight and shadow functions. According to this embodiment, parameters of the shadow function can be adjusted by moving the slide 63 up or down the scale 63A. The highlight function can be adjusted in a similar manner. As the slide is moved, corresponding highlight or shadow values are displayed in window areas 64 and 65. The value shown in window area 64 corresponds to the current endpoint value 22A (FIG. 2) and the value shown in window area 65 corresponds to the current endpoint value 23B (FIG. 2). In affect, moving the slide, moves points 22A and 23B in the vertical direction along the y-axis. In the case in which endpoints 23A and 22B are also varied, two additional slide adjusters can be included in window area 52. The maximum and minimum slide values define the dynamic pixel range of the image, (e.g., 0 and 255).

The interface further provides an "APPLY" button that, once selected, activates the tone adjustment operation according to the method of the present invention wherein the resulting tone adjusted image is redisplayed within area 61. The "REVERT" button allows the user to revert back to the previous highlight and shadow settings. Since the computation of the adjusted pixel values consists of a few minor computational steps per pixel value, the method according to the present invention for tone correction is adapted for real-time use via the interface shown in FIG. 6.

In the preceding description, numerous specific details are set forth, such as resolution and filter radius in order to provide a thorough understanding of the present invention. It will be apparent, however, to one skilled in the art that these specific details need not be employed to practice the present invention. In other instances, well-known computing system elements and image processing concepts have not been described in detail in order to avoid unnecessarily obscuring the present invention.

In addition, although elements of the present invention have been described in conjunction with certain embodiments, it is appreciated that the invention can be implemented in a variety of other ways. Consequently, it is to be understood that the particularly embodiments shown and described by way of illustration are in no way intended to be considered limiting. Reference to the details of these embodiments is not intended to limit the scope of the claims which themselves recited only those features regarded as essentials to the invention.

We claim:

1. A method of processing digital image data comprising a plurality of pixel values, the method comprising:

filtering the image data to obtain a locally averaged value for each pixel value;

for each pixel value in the image data:
   a) using its locally averaged value, to obtain a corresponding shadow value and highlight value from a selected shadow function and a selected highlight function, respectively;
   b) deriving at least one tone function from one of the corresponding shadow value and highlight value; and
   c) remapping each pixel according to its at least one derived tone function to obtain a tone adjusted pixel value.

2. The method as described in claim 1 wherein each of the selected highlight and selected shadow functions are both bounded by a dynamic range of the digital image data, the method further comprising:

d) varying function parameters of the highlight and shadow functions within the dynamic range;

e) performing a)–d) until a desired image quality is obtained.

3. The method as described in claim 1 wherein deriving at least one tone function comprises deriving a first tone function from the shadow value and deriving a second tone function from the highlight value.

4. The method as described in claim 3 wherein remapping each pixel value according to its at least one derived tone function comprises remapping each pixel value according to the first tone function to obtain an intermediate pixel value and remapping the intermediate pixel value according to the second tone function to obtain the tone adjusted pixel value.

5. The method as described in claim 3 wherein the first tone function is derived from a first ratio of: each pixel value/shadow value.

6. The method as described in claim 3 wherein the second tone function is derived from a second ratio of:

$$\left(\frac{\text{each pixel value} - \text{the highlight value}}{\text{the dynamic range} - \text{the highlight value}}\right).$$

7. The method as described in claim 2 wherein the function parameters are varied through a user interface.

8. The method as described in claim 1 wherein filtering further comprises filtering using a center-weighted circularly symmetric filter.

9. The method as described in claim 8 wherein a filtering radius of 7 pixels is selected when the image data has a corresponding dpi of 300.

10. The method as described in claim 8 wherein a filtering radius of 0 pixels is selected.

11. The method as described in claim 8 wherein a filter radius in the range of one pixel to the plurality of pixel values of the digital image is selected.

12. A system for processing image data including a plurality of pixel values comprising:
   image data filter for generating a corresponding locally averaged pixel value for each of the plurality of pixel values;
   means for providing a corresponding highlight value and a corresponding shadow value according to selected highlight and shadow functions, respectively, in response to each locally averaged value;
   tone function derivator for deriving at least one tone function based on one of the corresponding highlight value and shadow value; and
   remapper for remapping each pixel value according to the at least one derived tone function to obtain a tone adjusted pixel value.

13. The system as described in claim 12 further comprising a control input coupled to the means for providing corresponding highlight and shadow values, the control input for receiving control signals to adjust function parameters of the selected highlight and shadow functions.

14. The system as described in claim 12 wherein the image data filter, the means for providing corresponding highlight and shadow values, the derivator, and the remapper are implemented as one of software, hardware, firmware, and any combination of software, hardware, and firmware.

15. The system as described in claim 12 wherein the filter is a center weighted circularly symmetric filter.

16. The system as described in claim 15 wherein the image data has a resolution of 300 dpi and the filter has a pixel radius of 7 pixels.

17. The method as described in claim 15 wherein the filter has a pixel radius of 0 pixels.

18. The method as described in claim 15 wherein the filter has a pixel radius in the range of greater than or equal to one pixel and less than or equal to the plurality of pixel values of the digital image is selected.

19. The system as described in claim 13 further comprising:
   A user interface displayed on a display screen including:
      a display area for displaying the digital image prior to remapping the plurality of pixel values of the digital image and after remapping the plurality of pixel values;
      a means for receiving user adjustments to the parameters of the highlight and shadow functions, wherein the plurality of pixel values are remapped according to the user adjustments and the image is redisplayed in the display area.

20. A system for processing image data including a plurality of pixel values comprising:
   means for processing the plurality of pixel values for generating a corresponding locally averaged pixel value for each of the plurality of pixel values;
   means for providing a corresponding highlight value and a corresponding shadow value according to selected highlight and shadow functions, respectively, in response to each locally averaged value;
   means for deriving at least one tone function based on one of the corresponding highlight value and shadow value; and
   means for remapping each pixel value according to the at least one derived tone function to obtain a tone adjusted pixel value.

21. An article of manufacture for a computer, the article comprising:
   computer memory; and
   a program stored in the computer memory, the program, when executed, causing the computer to:
      filter the image data to obtain a locally averaged value for each pixel value;
      for each pixel value in the image data:
         a) use its locally averaged value, to obtain a corresponding shadow value and highlight value from a selected shadow function and a selected highlight function, respectively;
         b) derive at least one tone function from one of the corresponding shadow value and highlight value; and
         c) remap each pixel according to its at least one derived tone function to obtain a tone adjusted pixel value.

* * * * *